(No Model.)

A. T. GILBERT.
HOSE COUPLING.

No. 437,890. Patented Oct. 7, 1890.

Witnesses,
Geo. H. Strong.

Inventor,
Andrew T. Gilbert
By Dewey & Co.
Attys

UNITED STATES PATENT OFFICE.

ANDREW T. GILBERT, OF SALEM, OREGON.

HOSE-COUPLING.

SPECIFICATION forming part of Letters Patent No. 437,890, dated October 7, 1890.

Application filed May 19, 1890. Serial No. 352,407. (No model.)

*To all whom it may concern:*

Be it known that I, ANDREW T. GILBERT, a citizen of the United States, residing at Salem, Marion county, State of Oregon, have invented an Improvement in Hose-Couplings; and I hereby declare the following to be a full, clear, and exact description of the same.

My invention relates to the class of hose-couplings; and it consists in the novel constructions and arrangements hereinafter fully described, and specifically pointed out in the claim.

The object of my invention is to provide a simple and effective coupling which will admit of its ready connection either to join two pieces of hose or to connect the hose with the hydrant.

Figure 1:
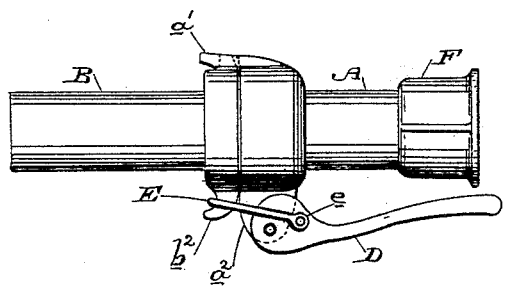
Figure 2:
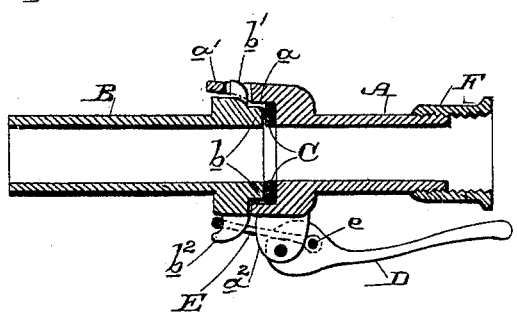

Referring to the accompanying drawings for a more complete explanation of my invention, Figure 1 is a side elevation of my coupling. Fig. 2 is a longitudinal section of same.

A is one coupling-pipe, and B is the other, the heads of the two pipes being adapted to fit closely together by means of a flange $b$ on one fitting in a socket $a$ in the other, a washer C intervening.

The coupling-pipe A is provided on one side of its head with a perforated ear $a'$, into which is adapted to fit a lug $b'$ on the head of the other coupling-pipe B. The coupling-pipe A on the other side of its head is provided with a bearing-flange $a^2$, and the coupling-pipe B is provided with a hook-shaped or grooved lug $b^2$.

Pivoted to the bearing-flange $a^2$ is a lever D, which carries a clamping-bail E, adapted to be fitted over the hook-shaped or grooved lug $b^2$. The bail E is pivoted to the head of the lever D at the point $e$ off the center of the pivot of the lever, so that when the lever is thrown up the bail is raised sufficiently to fit readily over or to be removed from the hook-shaped lug $b^2$; but when the lever is thrown down the bail is carried downwardly, and its upper end is tightened upon the hook-shaped lug, so that the two coupling-pipes are firmly held together. The pivotal center of the bail passes by the line of the pivotal center of the lever, whereby said lever is held in its downward position with no tendency to spring upwardly under the strain.

The coupling may be used to join two pieces of hose together, in which case the two coupling-pipes would be of the ordinary kind adapted to be fitted into and wired in the ends of the hose, or the coupling-pipe A may be secured to the hydrant by having upon it the internally-threaded sleeve F.

It will be seen that this coupling is a simple and effective one and can be quickly and easily manipulated. To couple the pipes, first fit lug $b'$ in ear $a'$, then bring the two heads together, then fit the bail over lug $b^2$, and turn the lever down, so as to tighten the bail and draw and hold the pipes together. To uncouple, throw the lever up, release the bail, and remove the lug $b'$ from ear $a'$.

Having thus described my invention, what I claim as new, and desire to secure by Letters Patent, is—

A hose-coupling consisting of the pipe A, having in its head the socket $a$, the perforated ear $a'$ on one side of said head and on the other side the bearing flange $a^2$, the coupling-pipe B, having in its head the flange $b$, adapted to fit the socket of the first head, the lug $b'$ on one side of its head, adapted to fit the perforated ear $a'$, and the hook-shaped or grooved lug $b^2$ on the other side of its head, the pivoted lever carried by the flange of the head A, and the swinging bail carried by the lever and adapted to engage the hook-shaped or grooved lug, substantially as herein described.

In witness whereof I have hereunto set my hand.

ANDREW T. GILBERT.

Witnesses:
E. H. WILLIAMS,
A. B. SMITH.